(12) United States Patent
Binns et al.

(10) Patent No.: US 6,488,760 B1
(45) Date of Patent: *Dec. 3, 2002

(54) UNIVERSAL PAINT TINTING CONCENTRATES

(75) Inventors: Mark Binns, Louisville, KY (US); Dana L. Phillips, Raymond, MS (US); Don Diehl, Louisville, KY (US); Stephen Korenkiewicz, Louisville, KY (US); Larry Brandenburger, Lino Lakes, MN (US)

(73) Assignee: The Valspar Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/653,296

(22) Filed: Aug. 31, 2000

Related U.S. Application Data

(63) Continuation-in-part of application No. 09/416,927, filed on Oct. 13, 1999, now Pat. No. 6,287,377.
(60) Provisional application No. 60/103,939, filed on Oct. 13, 1998.

(51) Int. Cl.$^7$ .............................. C09C 1/04; C09C 1/22; C09C 1/36; C09C 1/44; C09C 1/48
(52) U.S. Cl. .................. 106/499; 106/401; 106/410; 106/447; 106/460; 106/476; 106/493; 106/494; 106/495; 106/496; 106/497; 106/498; 106/504; 106/505
(58) Field of Search ................... 106/499, 401, 106/410, 436, 447, 460, 476, 493, 494, 495, 496, 497, 498, 504, 505

(56) References Cited

U.S. PATENT DOCUMENTS

| | | | |
|---|---|---|---|
| 2,635,057 A | 4/1953 | Jordan ....................... 106/307 |
| 4,156,095 A | 5/1979 | Jevne et al. ................. 562/509 |
| 4,741,781 A | 5/1988 | De Witte ..................... 106/304 |
| 4,909,852 A | 3/1990 | Atkinson ..................... 106/448 |
| 5,297,697 A | 3/1994 | Boring ......................... 222/83 |
| 5,401,313 A | 3/1995 | Supplee et al. ............. 106/712 |
| 5,560,521 A | 10/1996 | Boring et al. ............... 222/327 |
| 5,622,288 A | 4/1997 | Boring ........................ 222/327 |
| 5,821,283 A | * 10/1998 | Hessler et al. .............. 523/162 |
| 5,837,045 A | 11/1998 | Johnson et al. .......... 106/31.85 |

* cited by examiner

Primary Examiner—Anthony J. Green
(74) Attorney, Agent, or Firm—Schwegman, Lundberg, Woessner & Kluth, P.A.

(57) ABSTRACT

A universal tinting concentrate for both solvent- and water-based paints and coatings. The universal tinting concentrate is a composition which includes a colorant component, such as pigment, colorant, tinting agent and/or metal effect agent; a pigment dispersant including a moiety selected from the group consisting of an organic acid, anhydride, salt thereof, and derivative thereof, wherein the dispersant facilitates the dispersal of the colorant component in organic-based and aqueous-based vehicles; and a pH-neutralizing agent. In one embodiment of the invention, the pigment dispersant is represented by the following structure:

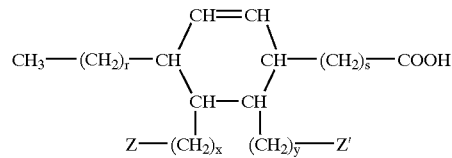

where
r and s are integers and r+s is 6 to 16;
x and y are integers and x+y is 0 to 19;
Z is H or COOH; and
Z' is H or COOH.

29 Claims, No Drawings

UNIVERSAL PAINT TINTING CONCENTRATES

RELATED APPLICATIONS

This application is a continuation-in-part of U.S. Ser. No. 09/416,927, filed Oct. 13, 1999; U.S. Pat. No. 6,287,377 (which is herein incorporated by reference) and further claims the benefit of U.S. Provisional Application No. 60/103,939, filed Oct. 13, 1998, under 35 U.S.C. 1.19(e).

BACKGROUND

Paints and coatings are used to protect a surface from corrosion, oxidation or other types of deterioration and to provide decorative effects. Organic solvent-based paint or coating is a uniformly dispersed mixture ranging in viscosity from a thin liquid to a semi-solid paste and includes a film-forming polymeric binder, an organic solvent, pigment and other additives. The binder and the solvent collectively make what is known as the "vehicle."

Latex or emulsion paint is a water-based paint or coating of a dispersion of dry powders of pigment and dispersed colorant, plus various paint additives such as fillers and extenders, and a resin dispersion. Typically the dry powder dispersion is made by milling the dry ingredients into water. The resin dispersion is either a latex formed by emulsion polymerization or a resin in emulsion form. The two dispersions are blended to form an emulsion, or latex, paint. Thus, the binder for latex paints and coatings is in an aqueous-dispersed form, whereas in a solvent paint or coating, it is in a soluble form. Latex paints and coatings are popular consumer paints, as they are easy to apply, are easy to clean up, are nonflammable, generally lack a disagreeable odor and can be used on both interior and exterior surfaces.

Pigments impart color to both solvent and latex paints and coatings. They also contribute to the opacity, durability and hardness of paint coatings. They are added to paint in the form of dry pigment powders and pigmented tinting concentrate during paint manufacture at the paint plant. In addition, especially for consumer latex paints, they may be added in the form of pigmented paint tinting concentrates at the point of sale, such as at retail paint stores. Essentially, the consumer may choose a custom-made color of the paint by having the retailer add a tinting concentrate to a white or tintable base.

Pigments are ordinarily organic or inorganic dry powders that incorporate a mixture of primary particles, aggregates and agglomerates. Aggregates are primary pigment particles joined face-to-face, and agglomerates are primary pigment particles joined at an edge or a corner. For both industrial and consumer paints, whether solvent- or latex-based, pigment preferably should be dispersed homogeneously throughout the paint. To properly be dispersed, pigments must be wetted, deaggregated and deagglomerated in the paint vehicle. Dry pigments are insoluble in organic solvents and water, therefore necessitating wetting, deaggregation and deagglomeration before dispersion forces can take full effect and enable the production of a stable, colloidal pigmentary dispersion in the paint vehicle. The wetting or deaeration process is physical in nature, as it requires that the vehicle or solvent displace the air on the surface of the pigment particles. An ideal dispersion consists of a homogenous suspension of primary particles, after reducing any aggregates and agglomerates to primary particles.

The wetting process is accomplished through the use of wetting agents, which typically are a type of surface-active agent or "surfactant." As discussed, wetting involves incorporation of the pigment into the vehicle replacing pigment-air interfaces with pigment-vehicle interfaces. Surfactants tend to bring pigment into solution as a result of surface activity at the pigment-solution interface. In general, surfactant molecules are composed of two segregated portions, one of which has sufficient affinity for the solvent (organic or aqueous) to bring the entire molecule into solution. The other portion is rejected by the solvent, because it has less affinity for the solvent than the solvent molecules have for each other. If the forces rejecting this group are sufficiently strong, the solute molecule will tend to concentrate at an interface, so that at least part of the area of the rejected group is not in contact with the solvent molecules. While some organic solvents may be good pigment wetting agents themselves, surfactants are typically added to solvent paints to ensure thorough pigment dispersion throughout the paint vehicle. Water-based systems are poor wetting agents of dry pigments, and thus, latex paints necessarily require the addition of surfactants for pigment dispersion.

Surfactants also stabilize the pigment dispersion from reaggregating and reagglomerating. In strongly polar organic solvents or water, electrostatic stabilization is imparted by charged species adsorbing onto the pigment surfaces. This causes a cloud of oppositely charged counter-ions to form around the particle, thus making an electric double layer that will repel similarly charged surfaces. In nonpolar systems, a steric-stability is imparted by the adsorbed dispersant that prevents close approach of the surfaces.

Surfactants conventionally used with tinting concentrates are primarily nonionic and amphoteric surfactants in conjunction with anionic surfactant. There are disadvantages with the known surfactants. Most notably, the surfactants known for use as pigment dispersants for both solvent, and latex paints or tinting concentrates therefor, can harm the rheological profiles of paints, tending to impart to a greater or lesser degree undesirable properties to the ultimately dried paint film. Surfactants can retard the curing or drying process of the paint and can increase the water sensitivity and reduce the scrub resistance of the dried film. Additionally, they can interfere with and hinder paint and pigment tinting concentrate thickeners and undesirably alter paint viscosity. Further, the primary nonionic surfactants used in conventional pigment dispersant formulations are alkyl phenol ethoxylates, which may be hazardous to human health.

SUMMARY

The present invention provides a universal tinting concentrate that may be used with organic solvent-based and latex or emulsion aqueous-based paints and coatings. The tinting concentrate of the present invention preferably provides particularly advantageous compatibility with both types of systems, and exhibits a highly desirable rheological profile. The inventive tinting concentrate provides improvements over the prior art, generally providing tinting concentrates which produce dried paint and coating films with faster curing, increased scrub resistance, better flash rust and corrosion resistance, and/or better rheological profiles than paints produced with known tinting concentrates. It is also an object of the present invention to provide a tinting concentrate that may be used to make paints with extremely low levels of volatile organic compounds ("VOC").

In one embodiment, the present invention is directed to a universal tinting concentrate for both solvent- and water-based paints and coatings. Preferred universal tinting concentrates of the present invention include compositions which include (i) a colorant component (e.g., a pigment, colorant, tinting agent, metal effect agent, etc.); (ii) a pigment dispersant; and (iii) a pH-neutralizing agent. Preferably, the pigment dispersant includes an organic acid, anhydride, salt thereof or derivative thereof. More preferably, the pigment dispersant contains no more than about 70 carbon atoms and most preferably has a total of about 15 to about 50 carbon atoms. In one preferred embodiment, the pigment dispersant is represented by the following structure:

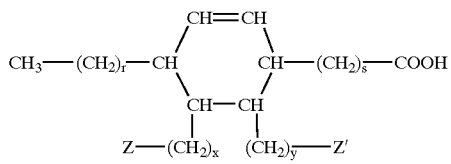

where r and s are integers and r+s is preferably 6 to 16;

x and y are integers and x+y is preferably 0 to 19;

Z is preferably H or COOH; and

Z' is preferably H or COOH.

Optional additional components for the universal tinting concentrate include a diluent; a dihydric or polyhydric alcohol; a polyether; a biocide; one or more conventional anionic and/or cationic surfactants; a defoaming agent; carboxyl-containing polymers, such as polyacrylates and/or carboxyl-containing polyurethanes, which can function as conventional dispersing agents; and additional pigment, colorant, tinting agent or metal effect agent. When added to paint, the universal tinting concentrate preferably has a pigment-to-vehicle binder ratio of from about 0.35 to 25.

These and other advantages of the present invention will become more apparent by referring to the detailed description and illustrative examples of the invention.

DETAILED DESCRIPTION

In one embodiment, this invention relates to a universal tinting concentrate (e.g., for paints and coatings). In a particularly preferred embodiment, this invention relates to a universal tinting concentrate for solvent-based and aqueous paints and coatings. The universal tinting concentrate accomplishes pigment dispersion in these dissimilar coating formulations through the use of a novel pigment dispersant (e.g., a dispersant comprising an organic mono- or polyacid, preferably having ionotropic character).

The advantages of the invention include an ability to use a single set of pigment concentrates for tinting organic- and aqueous-based paints and coatings. Additional advantages include improved dry response of paints and coatings formulated with the inventive tinting concentrate when compared to paint and coating formulations with prior art dispersants. In more preferred embodiments, there are significant (20 to 40%) increases in scrub resistance for paints and coatings formulated with the inventive universal tinting concentrate compared with paints and coatings formulated with prior art pigment dispersants or tinting concentrates. Paints and coatings formulated with the inventive universal tinting concentrate preferably show increased flash rust resistance when used in water-based paints directly over metal. Some paint and coating formulations using the inventive universal tinting concentrate show significantly reduced depression in viscosity when compared to the prior art. A further advantage is the virtual elimination of a VOC-contribution by the colorant to various coatings.

Both solvent-based and water-based paints and coatings include a binder. A "coating" is a film or a thin layer applied to a substrate, which may be clear or may contain pigment, colorant, tinting agent or metal effect. Paint is a type of coating, and hereinafter, unless otherwise noted, any reference to "paint" means both paint and coating.

Organic solvent-based paint ("solvent paint") is a uniformly-dispersed mixture ranging in viscosity from a thin liquid to a semi-solid paste and includes a polymeric binder; an organic solvent; pigment, colorant, tinting agent and/or metal effect agent; and other additives. The polymeric binder can be a drying oil, natural, semi-synthetic or synthetic resin such as polyacrylate, polyurethane, modified alkyd resin or other film-forming polymer. Included as well in the binder usually is a cross-linking agent, hardener, curing agent and/or secondary resin having cross-linking ability. The polymeric binder and the solvent collectively make what is known as the "vehicle."

"Pigment," usually in the form of organic or inorganic dry powder, is a substance that imparts color to another substance or mixture. "Colorant" is also a substance that imparts color to another substance or mixture, and generally includes pigment and other additives. "Tinting agent" similarly is a color-imparting agent. "Metal effect agent" is an agent that imparts metallic-type luster and associated properties to paint films. Hereinafter, unless otherwise noted, pigment, colorant, tinting agent and metal effect will be referred to collectively as "colorant component."

Latex or emulsion paint ("latex paint") is a water-based paint consisting of a dispersion of dry powders of pigment, plus various paint additives, such as fillers and extenders, and a resin dispersion. The dry powder dispersion is made by milling the dry ingredients into water. The resin dispersion is either a latex formed by emulsion polymerization or a resin in emulsion form, constituting the binder. The two dispersions are blended to form latex paint. Thus, the binder for latex paints is in an aqueous-dispersed form, whereas in a solvent paint, it is in a soluble form.

Preferred universal tinting concentrates of the present invention provide a single set of tinting concentrate formulations for use with either solvent or latex paints.

Preferred universal tinting concentrates include a suitable pigment dispersant (e.g., an organic acid, anhydride, salt thereof or derivative thereof ). Suitable organic acids, anhydrides, salts thereof or derivatives thereof are typically liquid, but may be a solid, at ambient temperature. More preferred organic acids, anhydrides, salts thereof or derivatives thereof are liquid at room temperature or have a melting point below about 70° C. The tinting concentrate preferably also includes a colorant component and a pH-neutralizing agent. Optional additional components for the tinting concentrate include additional colorant component, diluent, a base, a polyether, a biocide, one or more conventional anionic and/or cationic surfactants, a defoaming agent and carboxyl-containing polymers, such as polyacrylates, and/or carboxyl-containing polyurethanes, which can function as conventional dispersing agents.

Suitable organic acids, anhydrides, salts thereof or derivatives thereof used in the universal tinting concentrate, typically function as a pigment dispersant and have an ability to disperse the colorant component in organic-based and aqueous-based vehicles. Suitable pigment dispersants, while not necessarily completely miscible with all organic and aqueous solvents, preferably have at least some solubility in most organic- and aqueous-based solvents.

In one embodiment, the pigment dispersant is an acid or salt thereof. The chemistry of the acid or salt is preferably based upon an aliphatic organic molecule that contains at least one carboxylic acid, sulfonic acid or phosphoric acid group and aliphatic carbons. Saturated and/or unsaturated carbons may be present in the organic acid.

Suitable organic acids, which generally contain no more than about 70 carbon atoms, may function as a pigment dispersant. Typically, the pigment dispersant of the present invention is a polyacid or salt thereof containing a total of 6 to 50 carbon atoms. More typically, it is a polyacid or salt thereof containing 15 to 30 carbon atoms, two to four carboxyl groups and a chain of 14 to 22 aliphatic carbons, which chain may have one or more sites of unsaturation. As the alkylene chain is a hydrocarbon chain which may include portions of a cycloaliphatic ring.

Suitable acids include monoacids, polyacids, or a salt thereof. The mono- or polyacid or salt thereof more preferably contains no more than 60 carbon atoms and has a ratio of acid groups to aliphatic carbons of at least about 1:5 and preferably a ratio of from about 1:6 to about 1:25. Aromatic groups and cycloaliphatic groups may be present. Preferably, the aromatic and cycloaliphatic groups are present within the aliphatic carbon chain, such that these groups confer restricted rotation upon the acid or salt molecule. The acid typically constitutes between about 3 and 13% by weight of the total tinting concentrate. The pigment-to-binder ratio should be between about 0.35 and 25 when the tinting concentrate is mixed with a paint to provide color.

In a first preferred embodiment, the inventive dispersant is a carboxylic acid containing a total of 15 to 44 carbon atoms having the following chemical structure:

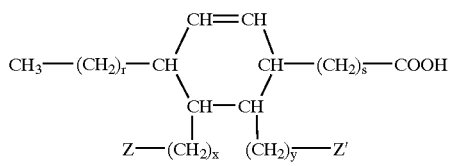

where
r and s are integers and r+s is preferably 6 to 16;
x and y are integers and x+y is preferably 0 to 19;
Z is preferably H or COOH; and
Z' is preferably H or COOH.

For ease of reference, where Z is H and Z' is COOH, this formula will be referred to as "Formula I." Alternatively, the dispersant is the salt of this dicarboxylic acid. A particularly suitable example of the above-referenced embodiments is a dicarboxylic acid in which r is 5, s is 7, x is 0 and y is 0. A particularly useful commercial example this embodiment is Westvaco Chemical's Diacid 1550, which is a blend of the above-referenced structure with 8 to 12% fatty acid. Another useful commercial example is Westvaco's Diacid 1550 XLM, which is the same structure without the fatty acid.

In a second preferred embodiment, the inventive dispersant is the dispersant of Formula I, but where Z is COOH and Z' is H. This formula will be referred to as "Formula II." Alternatively, the dispersant is the salt of this dicarboxylic acid. A particularly suitable example of this embodiment is a dicarboxylic acid in which r is 5, s is 7, x' is 0 and y' is 0.

It should be appreciated that the inventive dispersant may include a mixture of acids represented by both Formula I and Formula II.

Although dicarboxylic acids or their salts have not been known as effective pigment dispersants for paints, the process of making liquid dicarboxylic acids and their salts is known, as they have been used in a number of industrial and commercial applications, including those requiring the use of surfactants, disinfectants or detergents. A method of making C21 dicarboxylic acids, for example, is disclosed in U.S. Pat. No. 4,156,095 to Jevne, which method is incorporated herein by reference. As discussed therein, C21 dicarboxylic acids may be made by reacting polyunsaturated monocarboxylic fatty acid containing 16 to 20 carbon atoms with an unsaturated component, such as acrylic acid, in the presence of crystalline clay at a temperature between about 180 and 260 degrees Celsius. Also as discussed in U.S. Pat. No. 4,156,095, such dicarboxylic acids may also be made by reacting the polyunsaturated acid portion in a fatty acid mixture, such as linoleic acid derived from a tall oil fatty acid source, with an acrylic acid in the presence of an iodine catalyst at a temperature between 200 and 270 degrees Celsius. The resulting fatty acid dicarboxylic acid mixture may then be separated by distillation into oleic-type fatty acid and dicarboxylic acid fractions.

A further embodiment of the pigment dispersant of the inventive tinting concentrate is a polyacid that may include dimers and/or trimers of unsaturated mono- or dicarboxylic acids. Suitable exemplary acids that may be dimerized or trimerized include mid-sized olefinic acids (e.g., C6 to C20 unsaturated carboxylic acids, such as dimers or trimers, or arylaliphatic carboxylic acids, such as C9 to C20 aliphatic carboxylic acids which include a benzene ring or other aryl group). Examples of such arylaliphatic acids include aliphatic monoesters of acid trimelitic acids formed from substitutions of unsaturated carboxylic acid moieties on benzene or another aryl group.

An additional suitable pigment dispersant of this invention includes a Diels Alder adduct of unsaturated monocarboxylic acid and a hydrocarbon diene. An exemplary dispersant is a Diels Alder adduct of a C14 to C22 unsaturated fatty acid and a C4 to C6 dimer. Additional suitable acids include cyclopentadiene carboxylic acid dimer, linoleic acid dimer, the cycloaddition product of a C8 to C20 dienoic carboxylic acid and a C6 to C18 mono-enoic carboxylic acid.

Another embodiment of the inventive dispersant includes a tall oil fatty acid. Examples of such fatty acids include linoleic fatty acids and oleic fatty acids, or combinations thereof with or without other fatty acid. A suitable example is R—COOH, where R is a combination of about 38% non-conjugated linoleic fatty acid, 7% conjugated linoleic fatty acid, about 50% oleic fatty acid, about 2% saturated fatty acid and about 2% other component. A commercial example of this tall oil fatty acid is Acitnol FA-3.

A further embodiment of the inventive dispersant includes a polyhydroxy aliphatic monocarboxylic acid. An exemplary acid includes dimethylolpropionic acid. Further embodiments include an adduct of fatty acid and dimethylolpropionic acid; an adduct of dimer acid, Cardura E (the glycidyl ester of a linear or branched-chain alkynoic acid) and dimethylolpropionic acid; the adduct of Diacid 1550 and aminomethylolpropane; the adduct of Diacid 1550 and Cardura E; and adducts of any of the foregoing polyacids and Cardura E.

Useful examples of preferable salts of the polyacid include sodium salts, potassium salts, alkali salts generally, ammonium salts, amine salts and alkanolamine salts. A useful commercial example of such a salt is Westvaco's Diacid H-240, which is a 40% active potassium salt of Diacid 1550.

As previously mentioned, suitable pigment dispersants alternatively may be provided in the form of an anhydride or derivative.

Suitable anhydrides for use in the present invention include liquid or low melting anhydrides. In addition to the anhydride of the previously mentioned acids, other suitable anhydrides include:

dodecenyl succinic anhydride (DDSA, liquid at room temperature);
octadecenyl succinic anhydride (ODSA, m.p. 69° C.);
octenyl succinic anhydride (OSA, m.p. ~50° C.);
hexahydropthalic anhydride (HHPA, m.p. 35° C.);
methylhexahydro phthalic anhydride (MHHPA);
an eutectic blend of MHHPA and HHPA (m.p. −15° C.);
tetrahydro phtalic anhydride (THPA, m.p. ~70°–74° C.); and
methyl-5-norborene-2,3 dicarboxylic anhydride (MMDCA, liquid at room temperature).

Suitable pigment dispersants also include derivatives of the aforementioned acids and anhydrides. Derivitization may be employed, for example, to improve a particular dispersant's dispersing capabilities. For example, an anhydride dispersant may be reacted with a suitable agent (e.g., an amine) to provide a derivative dispersant. By way of example, octenyl succinic anhydride (OSA) may be reacted with: (i) water to provide an acid; (ii) diethanolamine to provide a monoamide; (iii) dimethyl ethanol amine to provide a monoester, a tertiary amine and a free acid; or (iv) Cardura E (a glycidyl ester of Versatic acid), water and dimethyl ethanol amine to provide a quaternary ester.

The tinting concentrate of the present invention is generally compatible with and may be used for both solvent and latex paints. It is useful with both solvent and latex paints because the monovalent aliphatic hydrocarbon portion of the acid gives the pigment dispersant lipophilic properties, while the pendant and terminal carboxyl group or groups, when neutralized, give it hydrophilic properties, allowing it to disperse pigment in both organic solvent and water, respectively. In addition, the unneutralized molecule can be used as a pigment dispersant in solvent-based colorant dispersions for use in solvent paint.

Pigments for use with the pigment dispersant of the present invention are known in the art. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow).

The pH neutralizing agent of the inventive universal tinting concentrate is used to maintaining pH of the tinting concentrate in the appropriate range, which is generally between about 6 and 10. The pH neutralizing agent is typically a base. When used with aqueous-based paints and many organic-solvent based paints, the base can act as a neutralizing agent for the acid, such that some or all of the acid is converted to salt form, and contributes to pH balance for the pigment. Typically, the base is added during the tinting operation for the paint. In particular, the base may be any organic or inorganic compound that will neutralize the acid and will be compatible with the binder resins, cross-linkers and other components present in the final paint composition. Bases such as alkali and alkali earth metal hydroxides, organic amines such as triethyl amine, pyridine and alkanolamine, can be used. Alkali and amines are particularly useful in the present invention by neutralizing the organic acid and generally buffering the system. Exemplary bases include ammonium hydroxide, sodium hydroxide, potassium hydroxide and sodium carbonate, which may be used in essentially VOC-free systems. In VOC-containing systems, preferable pH neutralizing agents include VOC-containing amine and alkanolamines, such as triethyl amine, dimethylethanol amine and aminomethylpropanol. Ammonium hydroxide is particularly suitable for neutralizing the organic acid of the inventive tinting concentrate.

The polyether component is optional, such that a mixture of polyacid, pigment and neutralizing agent are sufficient for the universal dispersant of the invention. The polyether, however, is an especially preferred component for dilution and polar-control of the dispersant formulation. The classes of compounds encompassed by the polyether include polyalkyl glycols, such as low to moderate molecular weight polyethylene and polypropylene glycols; polyhydroxy ethers, such as those formed from epoxide polymerization; polysaccharide compounds, such as polysorbitan and polysorbitol; polyalkylene oxides, such as polyethylene and polypropylene oxide.

Rather than using a polyether, a dihydric or polyhydric alcohol may be employed. Ethylene glycol is an exemplary dihydric alcohol. Propylene glycol is an exemplary polyhydric alcohol.

The universal pigment dispersant can be combined with organic solvent-based or aqueous-based vehicle formulations to provide colored paint formulations, examples of which are described in Examples 9 through 14 of preferred embodiments, below. A preferable polyether for the present invention is a linear ethylene glycol polyether of low molecular weight. More preferably, the ethylene glycol polyether has a molecular weight of between about 250 and 800. Most preferably, the polyethylene glycol polyether has a molecular weight ranging from 275 to 325. Medium molecular weight polyethylene glycols are advantageous for use as vehicle because they are substantially free of very low molecular weight volatile organic solvents, which are suspected toxins and/or teratogens. A particularly useful commercial polyethylene glycol is Union Carbide's PEG 300, having a molecular weight of about 285 to 315. Another useful commercial additive is Humectant GRB-2 from Zenica, which is contains glycerine and nonionic surfactant.

One or more co-surfactants known in the art, including conventional anionic, nonionic, amphoteric surfactants and/or cationic co-surfactants, may also be used, typically constituting between zero to about 15% and preferably from zero to about 10% by weight of the tinting concentrate. A particularly useful co-surfactant for the tinting concentrates of the present invention is lecithin, including water-dispersible lecithin, as lecithin has negligible effect on rheology and rheological modifiers. Depending on the particular tinting concentrate being made and the particular pigments needed to be dispersed, other co-surfactants may be used known for being appropriate surfactants for such pigments. Such additional exemplary co-surfactants include phosphate esters or polyacrylate salts, commercial examples of which include Rhodafac LO-529 from Rhone Poulenc or Nopcosperse 44 from Henkel, respectively. Great care must be used in selecting co-surfactants, as they can have a significant detrimental effect in properties.

A thickener or multiple thickeners may be also used to increase the overall viscosity of the dispersion. The thickener or thickeners should account for more thickeners between about zero and 5% by weight of the tinting concentrate. Exemplary thickeners include cellulose ethers; carboxymethyl cellulose; alginates; caseinates; hydrophobically-modified cellulose ethers; polyethylene oxide; polyvinyl alcohol; polyacrylamide; alkali-soluble acrylics and styrene/maleic anhydrides; alkali-swellable crosslinked acrylic emulsions, such as hydrophobically-modified alkali-swellable emulsions; and nonionic associative thickeners, such as hydrophobically-modified polyurethanes and polyethers. Thickeners for solvent-based dispersants include bentonite clays, organoclays, synthetic silicas, castor oil derivatives, modified acrylic copolymers, polyethylene glycol, polymerized oil derivatives, organic esters, and complex polyolefins.

A preferred thickener for use in latex paints pursuant to the present invention include synthetic hectorite. Particularly useful examples of commercial synthetic hectorite include United Catalysts' Optigel SH and Southern Clay Products' Laponite RD. A preferred thickener for use in solvent paints is a cross-linked polyacrylic acid, a particularly useful commercial example of which is BF Goodrich's Carbopol EZ-1.

In water-based dispersions, a defoaming agent may be added for ease of manufacture.

A biocide may also be added to the dispersant of the present invention to eliminate or inhibit the growth of microorganisms in the paint. Biocide will generally account for between 0 and 1% by weight of the tinting concentrate. Biocidal chemicals include chlorinated hydrocarbons, organometallics, halogen-releasing compounds, metallic salts, organic sulfur compounds, quaternary ammonium compounds and phenolics. A useful commercial example of biocide is Troysan 192.

Water may also be added to the tinting concentrates of the present invention, in an amount needed to make up the free volume. Generally, water may make up between about 0 and 75% by weight of the tinting concentrate volume, depending on the particular tinting concentrate.

In another embodiment of the present invention, a tinting concentrate (e.g., a standard tinting concentrate or a tinting concentrate of the present invention) is provided in an easy to use container. Tinting concentrates are conventionally provided in cans or jars. The tinting concentrate is then manually scooped out of the can or jar by the retail clerk and loaded into a tinting machine. This manual loading method suffers from several disadvantages. First, it is messy—not only may spillage occur when opening a can, but there is significant mess involved when scraping the can out. This mess can quickly cause the paint department to look untidy. In addition, the traditional cans are difficult to fully empty, thereby causing waste. Moreover, the not completely empty cans pose a disposal problem for the retailer.

To avoid these disadvantages, the present invention provides a cartridge-style container. Suitable cartridge-style containers for use with tinting concentrates include "tubes," "syringes," and "caulking" -type cartridges. These containers are preferred over traditional cans and jars. More preferably, the cartridge-style container permits the expressing of the concentrate from the container without the need to reach inside the container to scrape the walls of the container clean. Most preferred containers have a nozzle or adapter orifice that facilitates clean entry of the concentrate into the tinting machine.

Suitable containers for use in the present invention include metal and plastic tubes (e.g., "toothpaste" style tubes) and caulking-tube cartridges (e.g., cartridges with plungers such as are described, for example, in U.S. Pat. Nos. 5,622,288; 5,560,521; and 5,297,697, which are herein incorporated by reference).

The merits of the tinting concentrates of the present invention are further illustrated in the following examples.

EXAMPLES

In the Examples 1 through 8 below, tinting concentrates were made according to the present invention. Specifically, pigments were dispersed into vehicle containing water, defoaming agent, biocide, ammonium hydroxide, PEG 300, Westvaco Chemical's Diacid 1550 or Diacid 1550 XLM, thickener and co-surfactant.

Example 1

| | Black | |
|---|---|---|
| | Amount (g) | Percent by weight |
| PEG 300 | 51.3 | 5.13 |
| Carbon Black PB-7 | 120.3 | 12 |
| Diacid 1550 | 95.2 | 9.52 |
| Defoamer | 3.3 | 0.33 |
| Thickener | 9.3 | 0.93 |
| Ammonium hydroxide | 40.6 | 4.06 |
| Lecithin | 79.2 | 7.92 |
| Water | 599.9 | 59.99 |
| Biocide | 1 | 0.10 |
| Total | 1000 | 100.00 | pH: 8.5
Pigment/Binder Ratio: .69
Pigment % by Weight: 12.03

Example 2

| | Magenta | |
|---|---|---|
| | Amount (g) | Percent by weight |
| PEG 300 | 100 | 5.00 |
| Quinacridone Magenta PR-122 | 168 | 8.40 |
| Diacid 1550 | 250 | 12.51 |
| Defoamer | 4.6 | 0.23 |
| Thickener | 20 | 1.00 |
| Ammonium hydroxide | 95 | 4.75 |
| Lecithin | 60 | 3.33 |
| Water | 729.2 | 3.00 |
| Biocide | 2.0 | 65.00 |
| Total | 1999 | 100.00 | pH: 8.5
Pigment/Binder Ratio: 0.54
Pigment % by Weight: 9.33

Example 3

| | Brown Oxide | |
|---|---|---|
| | Amount (g) | Percent by weight |
| PEG 300 | 100 | 5 |
| Carbon Black PB-7 | 63 | 3.15 |
| Yellow Iron Oxide PY-42 | 130 | 6.5 |
| Red Iron Oxide PR-101 | 480 | 24 |
| Diacid 1550 XLM | 245 | 12.25 |
| Defoamer | 4 | 0.2 |
| Thickener | 6 | 0.3 |
| Ammonium hydroxide | 49 | 2.45 |
| Lecithin | 150 | 7.5 |
| Water | 651 | 32.55 |
| Biocide | 2 | 0.1 |

-continued

Brown Oxide

|  | Amount (g) | Percent by weight |
|---|---|---|
| Polyacrylate dispersant | 120 | 6.0 |
| Total | 2000 | 100 | pH: 7.2
Pigment/Binder Ratio: 2.75
Pigment % by Weight: 33.65

Example 4

Red Oxide

|  | Amount (g) | Percent by weight |
|---|---|---|
| PEG 300 | 50 | 5 |
| Red Iron Oxide PR-101 | 570 | 57 |
| Diacid 1550 | 60 | 6 |
| Defoamer | 4 | 0.4 |
| Suspending aid | 1 | 0.1 |
| Ammonium hydroxide | 20 | 2 |
| Lecithin | 60 | 6 |
| Water | 194 | 19.4 |
| Biocide | 1 | 0.1 |
| Polyacrylate dispersant | 40 | 4 |
| Total | 1000 | 100 | pH: 9
Pigment/Binder Ratio: 4.25
Pigment % by Weight: 57

Example 5

Phthalo Blue

|  | Amount (g) | Percent by weight |
|---|---|---|
| PEG 300 | 50.1 | 49.6 |
| Phthalo Blue PB-15:2 | 93 | 9.2 |
| Diacid 1550 | 120 | 11.88 |
| Defoamer | 2 | 0.20 |
| Thickener | 9.13 | 0.90 |
| Ammonium hydroxide | 55 | 5.44 |
| Phosphate Ester Surfactant | 40 | 3.98 |
| Water | 680.1 | 67.31 |
| Biocide | 1 | 0.1 |
| Total | 1005.23 | 100.00 | pH: 8.5
Pigment/Binder Ratio: 0.58
Pigment % by Weight: 9.20

Example 6

Phthalo Green

|  | Amount (g) | Percent by weight |
|---|---|---|
| PEG 300 | 458.7 | 7.00 |
| Phthalo green pigment PG-7 | 1264.3 | 19.28 |
| Diacid 1550 | 429.8 | 6.55 |
| Defoamer | 14.4 | 0.22 |
| Thickener | 71.8 | 1.10 |

-continued

Phthalo Green

|  | Amount (g) | Percent by weight |
|---|---|---|
| Ammonium hydroxide | 205.6 | 3.14 |
| Lecithin | 247.1 | 3.77 |
| Water | 3853.5 | 58.77 |
| Biocide | 11.76 | 0.18 |
| Total | 6556.96 | 100.01 | pH: 7.8
Pigment/Binder Ratio: 1.87
Pigment % by Weight: 19.28

Example 7

Yellow Oxide

|  | Amount (g) | Percent by weight |
|---|---|---|
| PEG 300 | 50 | 5 |
| Yellow Iron Oxide PY-101 | 600 | 60 |
| Diacid 1550 | 60 | 6 |
| Defoamer | 2 | 0.2 |
| Suspending aid | 5 | 0.5 |
| Ammonium hydroxide | 10 | 1 |
| Lecithin | 20 | 2 |
| Water | 202 | 20.2 |
| Biocide | 1 | 0.1 |
| Total | 1000 | 100 | pH: 7.51
Pigment/Binder Ratio: 6.15
Pigment % by Weight: 60

Example 8

White

|  | Amount (g) | Percent by weight |
|---|---|---|
| PEG 300 | 100 | 5 |
| Titanium Dioxide PW-6 | 1200 | 60 |
| Diacid 1550 XLM | 60 | 3 |
| Defoamer | 4 | 0.2 |
| Thickener | 3 | 0.15 |
| Ammonium hydroxide | 16 | 0.8 |
| Lecithin | 20 | 1 |
| Water | 595 | 29.75 |
| Biocide | 2 | 0.1 |
| Total | 2000 | 100 | pH: 7.5
Pigment/Binder Ratio: 15.0
Pigment % by Weight: 60

In Examples 9 through 14, some of the above tinting concentrates were added to various trade sales latex and alkyd bases to test compatibility and performance. The tinting concentrates were added volumetrically, depending on the base used. In particular, 2 ounces tint/gal. were added to pastel base, 4 ounces tint/gal. were added to medium base, 8 ounces tint/gal. were added to deep base and 12 ounces tint/gal. were added to clear base.

Example 9

Red oxide tinting concentrate from Example 4 was added to 8 ounces/gal. to Valspar Interior latex semi gloss wall and trim enamel 2408. As a comparison, an equal volume of Color Corporation's Red Universal Tint 1935, a conventional universal tinting concentrate, was added to another sample of the same paint. Scrub resistance was tested and measured by ASTM Test Method D 2486, where the number of back and forth strokes (cycles) required to remove the paint film was recorded, the results of which are as follows:

|  | Strength | Total light difference (DE) | Rubup | Scrubs |
|---|---|---|---|---|
| Example 4 red | 98.14% | 0.84 | None | 803 cycles |
| Color Corp. Red 1935 | 100% | N/A | None | 655 cycles |

Example 10

Eight ounces/gal. of each of red oxide tinting concentrate from Example 4 and the same conventional tinting concentrate of Example 9 were added to Valspar Interior latex flat wall paint 1408 to give the following results:

|  | Scrubs |
|---|---|
| Example 4 red | 529 cycles |
| Color Corp. Red 1935 | 448 cycles |

Example 11

Eight ounces/gal. of each of red oxide tinting concentrate from Example 4 and the same conventional tinting concentrate of Example 9 were added to Valspar exterior latex flat house paint to give the following results:

|  | Strength | lightness difference (DL) | chroma difference (DC) | Total difference (DE) |
|---|---|---|---|---|
| Example 4 red | 101.4% | −0.30 | 0.30 | 0.33 |
| Color Corp. Red 1935 | 100% | N/A | N/A | N/A |

Thus, the tint strength of the tinting concentrate of Example 4 was 101.4% compared to the conventional tinting concentrate, and the differences in lightness, chroma and total difference compared to the conventional tinting concentrate were −0.30 DL, 0.30 DC and 0.33 DE, respectively.

Example 12

The viscosity stability of the tinting concentrate of Example 4 was tested in a Stonner Viscometer at ambient temperature and at 120 degree F. for one month. Initial viscosity was 132 KU. After one month at ambient temperature, the viscosity was 130 KU. After one month at 120 degrees F., the viscosity was 132 KU.

Because of the extreme shear thinning of the rheology modifiers used in the example tinting concentrates, the viscosity data appear relatively high when measured under low shear conditions, such as with a Stormer Viscometer, however, a slight amount of force quickly reduces the viscosity to lower values for easy pumping and dispensing.

Example 13

Eight ounces/gal of the tinting concentrate of Example 6 was compared to the same amount of Color Corporation's Universal Green Tint 1921, a conventional tinting concentrate, in Valspar 2408 Interior latex semi/gloss wall paint and Valspar 1408 flat latex interior wall paint with the following results:

|  | Scrubs in 2408 base | Scrubs in 1408 base |
|---|---|---|
| Example 6 green | 898 cycles | 527 cycles |
| Color Corp. Green 1921 | 678 cycles | 360 cycles |

Example 14

The viscosity phthalo green tinting concentrate of Example 6 and the conventional tinting concentrate of the previous Example, in conjunction with two Valspar bases, were compared. Valspar 26090 is an interior semigloss latex. Valspar 40243 is an interior high gloss latex enamel. The results are as follows:

|  | 26090 | 40234 |
|---|---|---|
| Untinted viscosity | 107 KU | 106 KU |
| Example 6 green | 88 KU | 88 KU |
| Color Corp. Green 1921 | 84 KU | 84 KU |

The tinting concentrate of Example 6 as well as the corresponding conventional tinting concentrate were tested in the following paints:

202L Dunn Edwards flat latex house paint pastel base
45502 Valspar flat latex house paint tint base
2202 Valspar alkyd semi gloss enamel
2408 Valspar semi gloss interior enamel
97-33 Coronado oil solid color stain
142-1A/B Coronado Industrial water based Epoxy
8481 L&H AlkydLite High gloss water reducible alkyd deep base
180-38 Coronado Industrial DTM Acrylic Gloss deep base
M43-3A/B Benjamin Moore water base acrylic epoxy base 3
49-00N Mautz water based high gloss DTM latex clear base
139-1 Coronado Quick dry alkyd enamel tintable white
3811-6 Valspar Heavy Duty gloss alkyd enamel The compatibility results are as follows:

|  | 202L | 45502 | 2202 | 2408 | 97-33 |
|---|---|---|---|---|---|
| Example 6 green rubup (RU) | 0 | 0 | 0 | 0 | 0 |
| Color Corp. Green 1921 RU | 0 | 0 | 0 | 0 | 0 |

| -continued | | | | | |
|---|---|---|---|---|---|
| Example 6 green shake out (SO) | 103.62 | 100.56 | 100.41 | 99.74 | 101.63 |
| Color Corp. Green 1921 SO | 99.57 | 99.95 | 99.89 | 99.77 | 99.35 |

| | 142-1A | 8481 | 180-38 | M43-3A | 49-00 |
|---|---|---|---|---|---|
| Example 6 green rubup (RU) | 1 | 1 white floc | 1 | 1 white floc | 0 |
| Color Corp. Green 1921 RU | 1 | 1 white floc | 1 white floc | 1 white floc | 0 |
| Example 6 green shake out (SO) | 97.21 | 100.19 | 98.9 | 99.62 | 100.39 |
| Color Corp. Green 1921 SO | 102.99 | 97.83 | 99.58 | 98.42 | 99.76 |

| | 139-1 | 3811-6 | WKW0064 | WLW0021 |
|---|---|---|---|---|
| Example 6 green rubup (RU) | 1 | 1 | 1 white floc | 0 |
| Color Corp. Green 1921 RU | 0 | 0 | 1 white floc | 0 |
| Example 6 green shake out (SO) | 100.43 | 103.07 | 100.21 | 100.69 |
| Color Corp. Green 1921 SO | 97.67 | 98.51 | 99.3 | 100.5 |

The above specification, examples and data provide a complete description of the manufacture and use of the composition of the invention. Since many embodiments of the invention can be made without departing from the spirit and scope of the invention, the invention resides in the claims hereinafter appended.

All patents, patent applications, and literature cited in the specification are hereby incorporated by reference in their entirety. In the case of any inconsistencies, the present disclosure, including any definitions therein will prevail.

What is claimed is:

1. A composition, comprising:
   a colorant component;
   a pigment dispersant including a moiety selected from the group consisting of an organic acid, anhydride, a salt of an organic acid, and derivative thereof, wherein the dispersant is a liquid at ambient temperature and facilitates the dispersal of the colorant component; and
   a pH neutralizing agent;
   wherein the composition is in the form of a universal tinting concentrate that is compatible with organic-based and aqueous-based paints and coatings.

2. The composition of claim 1, further comprising a paint vehicle wherein when the tinting concentrate is added to paint vehicle, the concentrate-to-vehicle binder ratio is about 0.35 to about 25.

3. The composition of claim 1, wherein the moiety is an aliphatic acid.

4. The composition of claim 3, wherein the aliphatic acid has a ratio of acid groups to aliphatic carbon atoms of at least about 1:5.

5. The composition of claim 3, wherein the aliphatic acid includes one or more carboxylic, sulfonic or phosphoric acid groups, or any combination thereof.

6. The composition of claim 1, wherein the pigment dispersant constitutes between about 3 and about 13 wt. % of to universal tinting concentrate.

7. The composition of claim 1, wherein the moiety contains about 6 to about 50 carbon atoms.

8. The composition of claim 1, wherein the organic acid is a polyacid containing 19 to 30 carbon atoms, 2 to 4 carboxyl groups and an alkylenic chain of 14 to 22 aliphatic carbon atoms.

9. The composition of claim 1, wherein the acid is in the form of an alkali metal salt, alkaline earth metal, ammonium salt, amine salt or mixture thereof.

10. The composition of claim 9, wherein the amine salt includes alkanolamine salt.

11. The composition of claim 1, wherein the colorant component is organic or inorganic pigment, colorant, tinting agent, or metal effect agent, or any combination thereof.

12. The composition of claim 11, wherein the pigment is selected from the group consisting of titanium dioxide white, carbon black, lampblack, black iron oxide, red iron oxide, yellow iron oxide, brown iron oxide, phthalocyanine green, phthalocyanine blue, organic red pigments, quinacridone magenta, quinacridone violet, DNA orange, and organic yellow pigments, and any combination thereof.

13. The composition of claim 1, wherein the pH neutralizing agent maintains the pH of the tinting concentrate in a range of between about 6 and 10.

14. The composition of claim 1, wherein the pH neutralizing agent is a base.

15. The composition of claim 14, wherein the base is an alkali metal hydroxide, alkali earth metal hydroxide, alkali metal carbonate, alkali earth metal carbonate, alkali metal bicarbonate, alkali earth metal hydroxide, ammonium carbonate, ammonium bicarbonate, an organic amine, or any combination thereof.

16. The composition of claim 14, wherein the base is potassium hydroxide, sodium hydroxide, sodium carbonate, potassium carbonate, sodium bicarbonate, potassium bicarbonate, or any combination thereof.

17. The composition of claim 1, further comprising a dihydric or polyhydric alcohol.

18. The composition of claim 1, further comprising a polyether.

19. The composition of claim 18, wherein the polyether includes polyalkylene glycol, polyhydroxyether, polysaccharide or polyalkylene oxide.

20. The composition of claim 19, wherein the polyalkylene glycol has a molecular weight between about 250 and about 800 and includes polyethylene glycol or polypropylene glycol.

21. The composition of claim 1, further comprising an anionic surfactant, nonionic surfactant, amphoteric surfactant, or any combination thereof.

22. The composition of claim 21, wherein the surfactant constitutes between about 0 and about 15 percent by weight of the tinting concentrate.

23. The composition of claim 1, further comprising a thickener.

24. The composition of claim 1, wherein the moiety is an organic acid represented by the following structure:

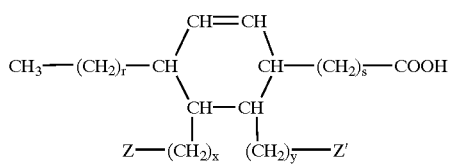

where r and s are integers and r+s is 6 to 16;

x and y are integers and x+y is 0 to 19;

Z is H or COOH; and

Z' is H or COOH.

25. The composition of claim 24, wherein Z is H; Z' is COOH; r is 4 to 6; 5 is 6 to 8; x is 0; and y is 0.

26. A universal tinting concentrate system, comprising:

a universal tinting concentrate including a liquid pigment dispersant, a colorant component, and a ph neutralizing agent;

wherein the pigment dispersant includes a moiety selected from the group consisting of an organic acid, anhydride, a salt of an organic acid, and derivative thereof, wherein the dispersant is a liquid at ambient temperature and facilitates the dispersal of the colorant component; and a cartridge-style container, wherein the universal tinting concentrate is compatible with organic-based and aqueous-based paints and coatings.

27. The universal tinting concentrate system of claim 26, wherein the cartridge-style container is selected from the group consisting of tubes, syringes and caulking-tube cartridges.

28. The universal tinting concentrate system of claim 26, wherein the cartridge-style container has a nozzle or adapter orifice that facilitates clean entry of the concentrate into a tinting machine.

29. A paint or coating composition comprising a) the composition of claim 1; and b) a paintt or coating vehicle;

wherein the colorant-to-vehicle ratio is about 0.35 to about 25.

* * * * *

UNITED STATES PATENT AND TRADEMARK OFFICE
CERTIFICATE OF CORRECTION

PATENT NO.   : 6,488,760 B1  
DATED        : December 3, 2002  
INVENTOR(S)  : Larry Brandenburger et al.

Page 1 of 1

It is certified that error appears in the above-identified patent and that said Letters Patent is hereby corrected as shown below:

Column 13,  
Line 20, delete "Hat" and insert -- flat -- therefor.  
Line 53, delete "Stonner" and insert -- Stormer -- therefor.

Column 15,  
Line 58, delete "to" and insert -- the -- therefor.

Column 17,  
Line 16, delete "5" and insert -- s -- therefor.

Column 18,  
Line 19, delete "paintt" and insert -- paint -- therefor.

Signed and Sealed this

Tenth Day of June, 2003

JAMES E. ROGAN  
*Director of the United States Patent and Trademark Office*